United States Patent [19]

Yamashita et al.

[11] Patent Number: 4,936,656

[45] Date of Patent: Jun. 26, 1990

[54] VIDEO PROJECTOR

[75] Inventors: Ichiro Yamashita, Katano; Mamoru Takeda, Hirakata; Yoshito Miyatake; Yoneharu Takubo, both of Neyagawa, all of Japan

[73] Assignee: Matsushita Electric Industrial Co., Ltd., Osaka, Japan

[21] Appl. No.: 168,318

[22] Filed: Mar. 18, 1988

[30] Foreign Application Priority Data

Mar. 18, 1987 [JP] Japan .................................. 62-62922
Nov. 12, 1987 [JP] Japan ................................ 62-286015

[51] Int. Cl.$^5$ ........................... G02F 1/13; G09G 3/36
[52] U.S. Cl. ..................................... 350/333; 350/338; 350/334; 340/784; 353/34
[58] Field of Search ............... 350/333, 334, 345, 335, 350/338; 353/31, 34, 37, 49; 340/784

[56] References Cited

U.S. PATENT DOCUMENTS

| | | | |
|---|---|---|---|
| 4,425,028 | 1/1984 | Gagnon et al. | 350/345 X |
| 4,544,237 | 10/1985 | Gagnon | 350/331 R |
| 4,761,058 | 8/1988 | Okubo et al. | 350/333 X |
| 4,781,438 | 11/1988 | Noguchi | 350/333 X |
| 4,822,142 | 4/1989 | Yasui | 350/333 X |

FOREIGN PATENT DOCUMENTS

| | | | |
|---|---|---|---|
| 6113885 | 6/1984 | Japan. | |
| 2034953 | 6/1980 | United Kingdom | 340/784 |
| 0112700 | 7/1984 | United Kingdom | 340/784 |
| 2133602 | 7/1984 | United Kingdom | 340/784 |

OTHER PUBLICATIONS

Depp et al, "Liquid Crystal Display Driver Circuit and Polysilicone Components Therefor", IBM, vol. 23, No. 8, Jan. 1981, p. 3863.
Kawai et al "A Self-Alignment processed a-Si:H TFT Matrix Circuit for LCD Panels" Proceedings of the SID, vol. 25/1, 1984.

Primary Examiner—Stanley D. Miller
Assistant Examiner—Huy K. Mai
Attorney, Agent, or Firm—Wenderoth, Lind & Ponack

[57] ABSTRACT

A video projector utilizes a reflective liquid crystal light valve of the active matrix system and a polarizing beam splitter. An active matrix array circuit of the light valve has pixel electrodes arranged in a matrix mattern. The pixel electrodes each has a reflective surface for reflecting a light beam and protects corresponding switch elements from the light beam. There are provided at least two switch elements for each of the pixel electrodes so as to enhance the redundancy of the array circuit. Further, each pixel electrode is provided with a suitable additional capacitance.

18 Claims, 12 Drawing Sheets

VIDEO PROJECTOR

BACKGROUND OF THE INVENTION

1. Field of the Invention

The present invention relates to a video projector for displaying an image according to television signals and the like and, more particularly, to a video projector using an active matrix liquid crystal light valve.

2. Description of the Prior Art

Conventionally, in video projectors made for home use there is employed a CRT as is seen in the case of rear projection TV. Video projectors of the CRT system have a more or less satisfactory degree of display quality with respect to images of such resolution level as presently available TV signals, but still it can hardly be said that they are capable of displaying images with sufficient brightness. Further, if they were to display images of such high definition TV as would be a reality in the near future, it would be almost impracticable to expect that the required display quality for the purpose could be provided at some reasonable cost, in view of those serious problems which will be pointed out hereinbelow. Whereas the degree of resolution available with the existing TV system is of the order of $500 \times 600 = 300,000$ pixels, that of the would-be high definition TV will be $1000 \times 1500 = 1,500,000$ pixels, or about five times as high as the presently available TV image resolution.

A first problem with the CRT system video projector is that there is some tradeoff between the brightness and the resolution on the faceplate of the CRT, and further that luminous rays from the CRT tend to spread over a wide area, so that the available quantity of light is limited. Therefore, video projectors using a CRT require a very costly projection lens with large aperture in order to attain improved efficiency of light utilization, but yet it is difficult that they provide sufficient brightness on the screen.

A second problem with the CRT system video projector is that distortions occur in the trace of the electron beam on the surface of the CRT, with the result that some distortion is present in an image on the CRT surface. Therefore, with a full color video projector of the three-tube CRT system, high-precision adjustment and matching measures are required for convergence correction of each CRT and otherwise. Such adjustment becomes difficult in abrupt proportion as the required degree of resolution of the to-be-displayed image becomes higher.

As an alternative to the CRT system, light valve system projectors have already been proposed. For example, a photoconductive-type liquid crystal valve has been reported in the 1979 SID international Symposium, Digest of Technical Papers, pages 22 to 23. By the term "light valve" is meant a device which is capable of changing, or modulating, the properties of light rays incident thereon, such as their amplitude and polarizing plane, as required by externally given signals, then projecting the modulated light rays; and herein the term specifically refers to such device of the type which can two-dimensionally control or modulate rays of incidence for image formation. A projector of this system includes a light source, a light valve, a projection lens, and a screen, wherein light rays from the light source are modulated by the light valve for formation of a light image, the light image so formed being projected through the projection lens onto the screen.

However, the state of the art of light valve system projectors is still insufficient for commercialization of such projectors for home use. Nevertheless, one type of light valve is recently attracting great attention, that is, light valves of the type which utilize liquid crystal and, more particularly, those known as liquid crystal light valves of the active matrix system are considered promising for their potentiality of providing high picture quality. Typical examples of such system are those disclosed in Japanese Patent Publication Nos. 59-230383 and 61-13885.

The term "active matrix system" used herein means a liquid crystal driving scheme as so called in comparison with the conventional simple matrix scheme, wherein switching elements are individually provided for pixel electrodes arranged in a matrix pattern, through which switching elements driving signals are given independently to the individual pixel electrodes for controlling the optical properties of the liquid crystal. A liquid crystal light valve of this system, as will be described hereinafter, has a feature that it is essentially free of such crosstalk as is usually seen with the conventional simple matrix scheme, or a phenomenon such that electrical signals supplied to different pixel electrodes intermingle with one another, which will be a cause of display quality deterioration; therefore, the light valve can display large-volume information while maintaining high contrast and good image quality.

Now, in order to facilitate the understanding of the following description, a basic construction of an active matrix system liquid crystal light valve and the manner of operation thereof will be briefly explained.

The liquid crystal valve comprises an array substrate, a counter substrate having a counter electrode, and a liquid crystal layer interposed between the two substrates. On the array substrate there is formed such an active matrix array circuit 1 as shown in FIG. 1. The array circuit consists of a plurality of scanning lines Xn ($n = 1, 2, \ldots, N$), a plurality of signal lines Ym ($m = 1, 2, \ldots, M$), pixel electrodes disposed at intersections between both the scanning and the signaling lines, and switching elements Tn, m connected to the corresponding pixel electrodes and controlled by the corresponding scanning lines. In FIG. 1, each switching element is a thin film transistor.

In operation, the signal lines have a role of leading video signals supplied from an externally provided video signal supply circuit 2, to the individual switching elements. The counter electrodes keeps a common reference level for the video signals, or acts as a ground. Selection pulses S1, S2, S3, ..., SM as shown in FIG. 2, which do not overlap in time, are sequentially applied as control signals to the scanning lines X1, X2, X3, ..., XN respectively from a control signal generating circuit 3. When a selection pulse is applied to one, e.g. X1, of the scanning lines (i.e. X1 is in a "selected phase"), a series of switching elements connected to the line become conductive to transmit a video signal to the corresponding series of pixel electrodes. At this time, all the other scanning lines are in a "non-selected phase". Voltages applied to the series of pixel electrodes are held until the scanning line X1 is selected next time. The voltage holding capability depends on the capacitance Cn, m present between each pixel electrode and the counter electrode.

The video signal applied to each pixel electrode controls the electro-optical property of the liquid crystal layer interposed between the pixel electrode and the counter electrode, and more particularly the polarizing angle of the light rays which pass through the liquid crystal layer. The electro-optical property of the liquid crystal layer is by nature determined by an effective voltage applied to the layer. As already explained, an effective voltage applied to the liquid crystal layer for a given pixel is generally equal to a signal voltage which is transmitted to the corresponding pixel electrode from a signal line through a switching element when a selection pulse is applied. With the active matrix system, it is possible to independently control the electro-optical properties of the individual pixels in this way.

In order to enhance the performance of the liquid crystal light valve for holding the voltage applied to each pixel electrode, it is more preferable to provide each pixel electrode with an additional capacitance $C_{n,m,S}$. Such additional capacitance may be sometimes provided between each pixel electrode and a separately formed common electrode, but the trouble in such case is that increased process steps are involved in the formation of the array substrate. Therefore, it is more common to provide the additional capacitance between a preceding scanning line $X_{n-1}$ and a pixel electrode $P_{n,m}$, as shown in FIG. 1.

However, the video projectors of the liquid crystal light valve system which have thus far been proposed still involve a number of problems such as those stated hereinbelow.

In a video projector using a liquid crystal light valve, how far the light valve could be compacturized has great bearing upon the cost of the optical system and accordingly the cost of the projector system. Therefore, in the area of application which require large-volume information display as in the case of high definition TV, a light valve having a very high degree of pixel density is required. In other words, dimensions (areas) allotted to individual pixels of the light valve are very small. Whilst, the region for arrangement of signal lines, scanning lines, and switching elements occupies a generally fixed area irrespective of the space required for the pixels. This region has to be counted as a dead area which does not contribute to the control of light rays. Therefore, the proportion of an area which can be utilized for effective control of light rays of the area allotted to one pixel (which proportion is called "opening") is abruptly reduced as the size of the pixel becomes smaller. This naturally means reduced efficiency of light utilization. This is pointed out as a first problem.

The light valve is constantly exposed to a very intense illumination of light beams. The light beams induce photoconduction of the individual switch elements connected to the pixel electrodes, which is likely to be a cause of lowered image quality. The reason for this is that where there is some photoconduction, any of the switch elements may be brought into a slightly conductive state even if it is in the non-selected phase, with the result that the voltage applied to the pixel electrodes cannot be sufficiently held. Since each switch element is formed of a semiconductor or a very thin insulating material, it is susceptible to the influence of light beams. This is a second problem.

A third important problem with a high-density liquid crystal light valve intended for large-volume information display is a low production yield of such light valve. On factor having the greated bearing upon production yield is the presence of defective switch elements. If there is any defective switch element, the pixels connected to the switch element does not perform their proper display function, which is a direct cause of the so-called display defect. From a statistical point of view, as the earlier given example may suggest, it is extremely difficult indeed to produce as many switch elements as 1,500,000 defect free.

As far as this problem is concerned, we have already proposed, in our previous U.S. patent application Ser. No. 798,030, an approach for overcoming the difficulty relating to production yield by adoption of such a redundancy arrangement that two or more switch elements are provided for each pixel as shown in FIG. 3, so that defective switching elements, if any, can be removed by trimming. For the following two reasons, however, it is difficult to immediately apply this approach to a light valve having a very high degree of pixel density to which the present invention is directed.

One reason is the increased number of switch elements per pixel, which results in reduced opening.

The other reason is the problem of capacitive coupling due to the additional capacitance, which will be explained below. FIG. 4 illustrate an array circuit representing the above proposed arrangement in which additional capacitances are provided. Attention is called to a pixel electrode $P_{n,m}$. In the case where the switch element $T_{n,m,A}$ is separated because of its defective quality, there will be no problem. But if the switch element $T_{n,m,B}$ is removed, the change of the control signal applied to the scanning line $X_{n1}$ from selection to non-selection, is transmitted to the pixel electrode through the additional capacitance $C_{n,m,S}$, so that the potential of the pixel electrode deviates from its should-be value. This means that despite the fact that the defective switch element has been separated, the pixel electrode does not perform its proper display function.

As explained above, the prior art liquid crystal light valves are not properly adapted for provision of higher pixel density, and are much liable to adverse effects of the illuminated light beams. Further, there is no effective means for improvement of production yield. As such, they are unsuitable for use in a video projector for large-volume information display.

SUMMARY OF THE INVENTION

An object of the invention is to provide a video projector well suited for home use by adopting a novel active matrix system liquid crystal light valve which is well adapted for provision of higher pixel density, less subject to adverse effects of an illuminated light beam, and which can be produced at high yield.

In order to accomplish this object, the present invention provides a video projector using a reflective type active matrix liquid crystal light valve of such arrangement as will be described hereinbelow, and an optical system for effective utilization thereof. The video projector in accordance with the invention comprises the liquid crystal light valve, a light source, and an optical system for linearly polarizing light rays from the light source for incidence on the liquid crystal light valve so that an optical image projecting from the liquid crystal light valve is projected onto a screen.

The liquid crystal light valve of the invention comprises a first planar substrate of the light transmission type including a transparent electrode; a second planar substrate on which an array circuit is formed which includes a plurality of scanning lines, a plurality of signal lines, a plurality of pixel electrodes arranged at intersections between the individual scanning lines and the individual signal lines, and switch elements connected to the individual pixel electrodes and controlled by the scanning lines; and a liquid crystal layer interposed between the two substrates. The pixel electrodes each include a reflective surface for reflecting light rays of incidence from the first substrate side which strike on the surface, and the pixel electrodes are arranged so that the switch elements are protected from direct exposure to the incident light rays.

The individual switch elements transmit the voltage of the signal lines to the individual pixel electrodes under such timings as are controlled by the scanning lines. The polarlizing condition of the light rays passing through various portions of the liquid layer interposed between the individual pixel electrodes and the transparent electrodes will vary according to the voltage transmitted to the individual pixel electrodes. In this way, the linearly deflected light rays incident from the first substrate side will, after their passage through the liquid crystal layer, be reflected by the pixel electrodes, and again pass through the liquid crystal layer until they are projected. The polarizing condition of the light rays is modulated according to the voltages applied to the pixel electrodes so that an optical image is formed.

Preferably, a plurality of switch elements are provided for each pixel in the active matrix array circuit so that the plurality of switch elements connected to a corresponding pixel electrode are controlled by at least two different scanning lines. These switch elements may be adapted to be electrically separated from the array circuit as required. More preferably, in the array circuit there are provided at least two switch elements for each pixel electrode, and an additional capacitance for each pixel electrode. The additional capacitance is provided between the pixel electrode and a scanning line other than those for controlling the switch elements connected to the pixel electrode.

Through the above described arrangement, the liquid crystal light valve of the invention has a first advantage that all the areas excepting small gaps each for electrically separating adjacent pixels from each other can be effectively utilized as pixel electrodes, so that as compared with the prior art liquid crystal light valves, it can provide greater opening, that is, greater efficiency of light source utilization. Hence, as a second advantage, it is possible to provide higher pixel density without any substantial decrease in such opening, thereby to attain considerable area reduction of the light valve, which means reduced costs of the light valve and the optical system. A third advantage is that the pixel electrodes serve to shield the switch elements from intense light beams of the projection light source, so that the liquid crystal light valve of the invention is free from the possibility of functional deterioration of the switch elements due to photoconduction. Thus, the light valve is able to effectively perform its proper function expected as an active matrix system light valve.

Furthermore, the active matrix liquid crystal light valve exhibits its excellent performance quality, especially when it is constructed as one of the active matrix driving system with some degree of redundancy, such that each pixel electrode is driven by two or more pixel switch elements. Since an active matrix liquid crystal light valve has a switch element for each pixel, the manufacture thereof involves a considerably complicated process and a low rate of production yield, which fact has been pointed out as a drawback. However, by providing such redundancy as above, thereby permitting any defective switch element to be separated from the array circuit, it is possible to remarkably improve the production yield. With the prior art liquid crystal light valves, any increase in the number of pixel switch elements leads to a further reduced rate of opening, and as such there has been little possibility for utilization of such valve in a video projector in which high pixel density is required. In contrast to the prior art liquid crystal light valves, the present invention makes it possible to increase the number of pixels for provision of some increased redundancy with no or little reduction in the rate of opening. In this conjunction, it is possible to further enhance the display performance of the liquid crystal light valve of the invention by provision of such additional capacitance as above mentioned.

DESCRIPTION OF THE PREFERRED EMBODIMENTS

Figure 5:
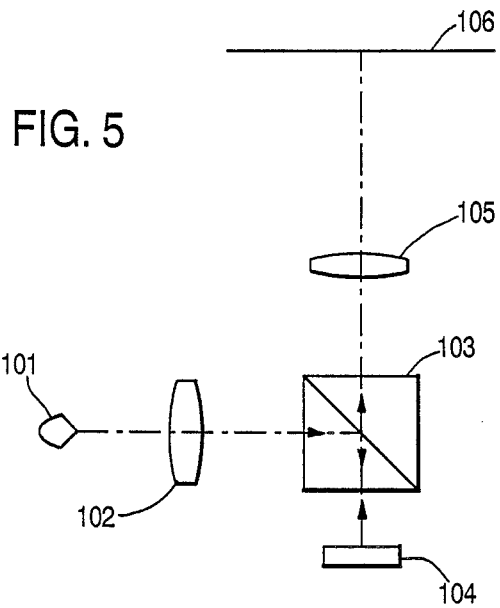
FIG. 5 is a diagram showing a general arrangement of a first embodiment of the video projector according to the present invention.

Referring to FIG. 5, a first embodiment of the video projector in accordance with the invention include a light source 101, a collimater lens 102, a polarizing beam splitter 103, a reflective liquid crystal light valve 104, and a projection lens 105. A light beam projected from the light source 101 and incident on the polarizing beam splitter 103 via the collimater lens 102 by which the light beams are made into parallel luminous fluxes are linearly polarized so that they strike on the liquid crystal light valve 104 in generally vertical relation thereto. The liquid crystal light valve 104 reflects the incident light rays after modulating the polarizing planes of the light rays by respective pixels. The reflected light rays from the liquid crystal light valve become incident on the polarizing beam splitter once again, and according to the degree of modulation on the polarizing planes thereof, they pass through the polarizing beam splitter before they reach the projection lens 105. Accordingly, a video image which has been luminance-modulated by the liquid crystal light valve is formed on a screen 106.

Figure 6:
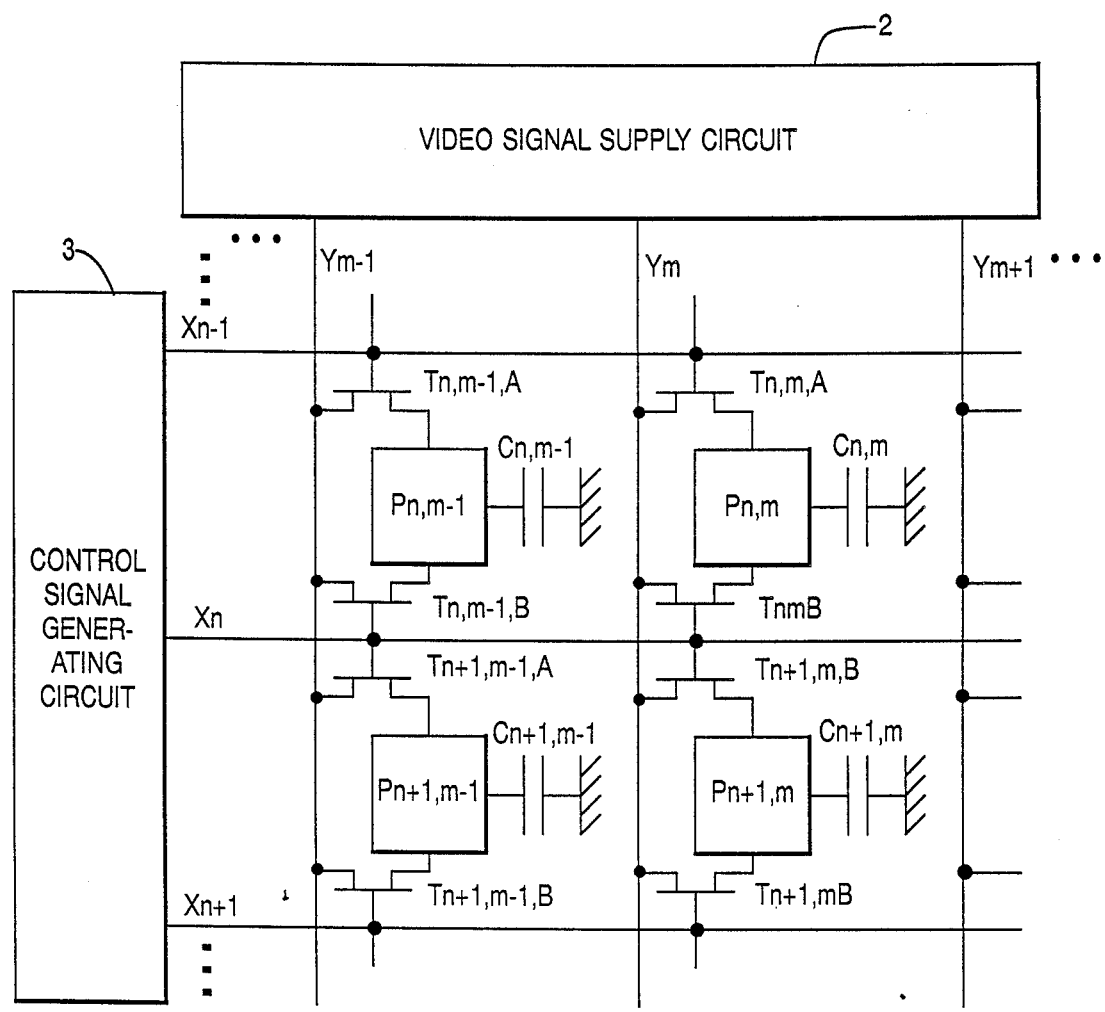
FIG. 6 is a diagram showing an array circuit of a liquid crystal light valve of the invention.

FIG. 6 shows an active matrix array circuit of the liquid crystal light valve, in which Ym−1, Ym, Ym+1 represent signal lines, Pn,m−1, Pn,m, Pn+1,m−1, Pn+1,m represent pixel electrodes, and Cn,m−1, Cn,m, Cn+1,m−1, Cn+1, m represent capacitances formed by the pixel electrodes and the counter electrode. Designated by Tn,m−1,A, Tn,m,A, Tn+1, m−1,A, Tn+1,m,A, and Tn,m−1,B, Tn,m,B, Tn+1,m,B are switch elements comprised of thin film transistors (TFT). In FIG. 6, the array circuit is shown in part only; and actually it includes N scanning lines X1−XN, M signal lines Y1−YM, N×M pixel electrodes P1,1−PN,M, 2(N×M) TFTs T1,1,A−TN,M,A and T1, 1,B−Tn,M,B, and N×M capacitances C1,1−CN,M.

In this embodiment, each pixel electrode Pn, m is driven by two TFT's, that is, an auxiliary TFT Tn,m,A and a main TFT Tn,m,B. By providing two TFT's for each fixed electrode as in this embodiment it is possible to give some degree of redundancy. As described in detail in U.S. patent application Ser. No. 798,030, such arrangement is really effective for production yield improvement. That is, if one of the two TFT's is found defective in the process of manufacture, the one TFT may be separated from the array circuit so that necessary signals are supplied to the pixel electrode through the other TFT.

In this embodiment, three TFT terminals, namely, source, drain, and gate terminates, are respectively connected to a corresponding signal line, a corresponding pixel electrode, and a corresponding scanning line. To separate a defective TFT from the array circuit, at least two of the joints for the three TFT terminals may be cut off by laser trimming. In order to permit easy cutting, it is desirable to provide a trimming portion at the stage of mask designing. The laser trimming may be carried out in the process of manufacture, but if the second substrate is formed of a material which is transparent (for example, a glass-made substrate) in relation to the wave length (e.g., 1 μm where YAG laser is used) of the processing laser, it is possible to carry out such trimming even at the stage of finished panel after arraying and liquid crystal injection processes have already been completed. The latter is very convenient from the practical points of view.

Figure 7:
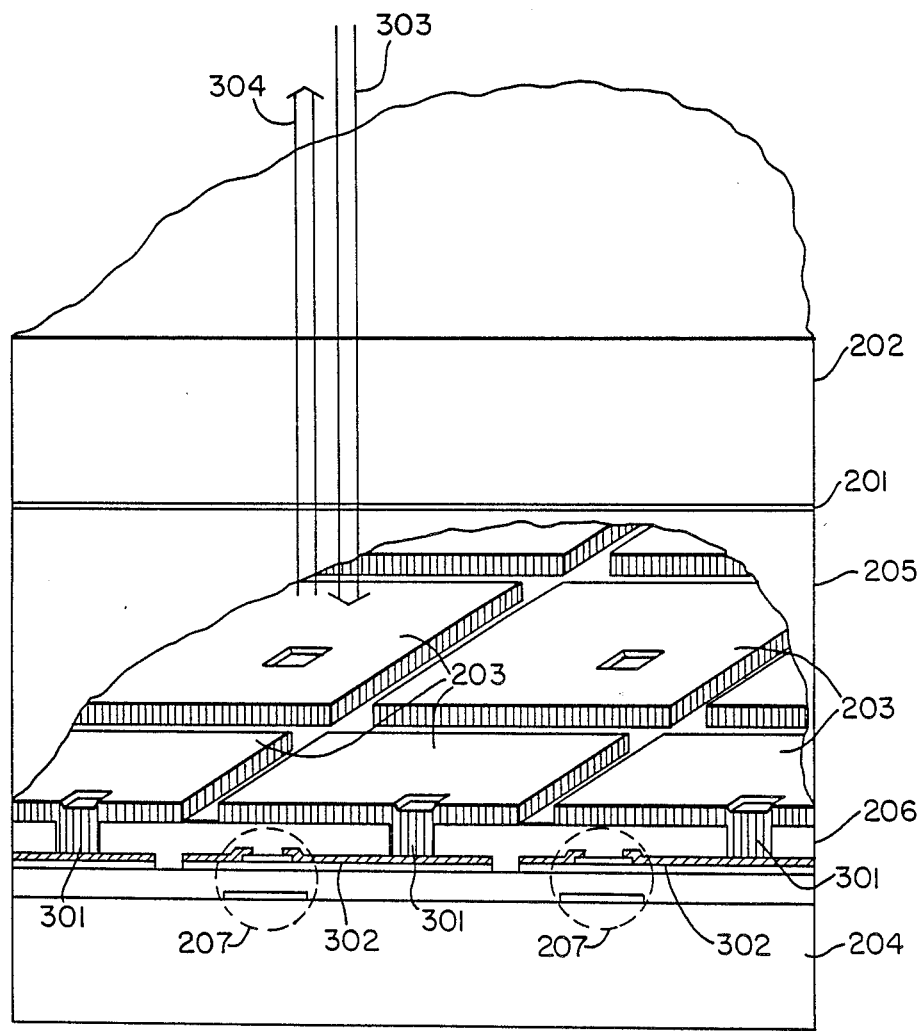
FIG. 7 is a sectional view showing the liquid crystal light valve of the invention.

FIG. 7 shows the construction of the liquid crystal light valve according to the invention, wherein a liquid crystal layer 205 is interposed between a transparent first substrate 202 having a transparent counter electrode 201 and a second substrate 204 including pixel electrodes. 203, switch elements (TFT) 207, and the like. Each pixel electrode 203 is connected via a contact hole 301 provided on an insulating film 206 to a drain 302 of a switch element. The pixel electrode is so formed as to completely cover the TFT portion so that incident light rays 303 are not incident on the TFT. The surface of each of the pixel electrodes 203 is a reflective surface so that the incident light rays 303 from the first substrate side are reflected by the pixel electrodes 203 to become reflected light rays 304.

In a conventional liquid crystal light valve, a light shield is provided to prevent the TFT from being struck by the incident light beams. Since the luminance of the incident light rays is so intense that in addition to the direct light rays, those entering through small gaps, of the light shield by multiple reflection cannot be ignored. Therefore, it is necessary to extend the light shield to peripheral areas of the TFT portion, which results in further contraction of the opening. According to the invention, however, the pixel electrodes each serve as an extensive shield plate, and therefore it is possible to provide TFT at a position satisfactory enough to prevent photoconduction without care about the problem of opening.

Figure 8:
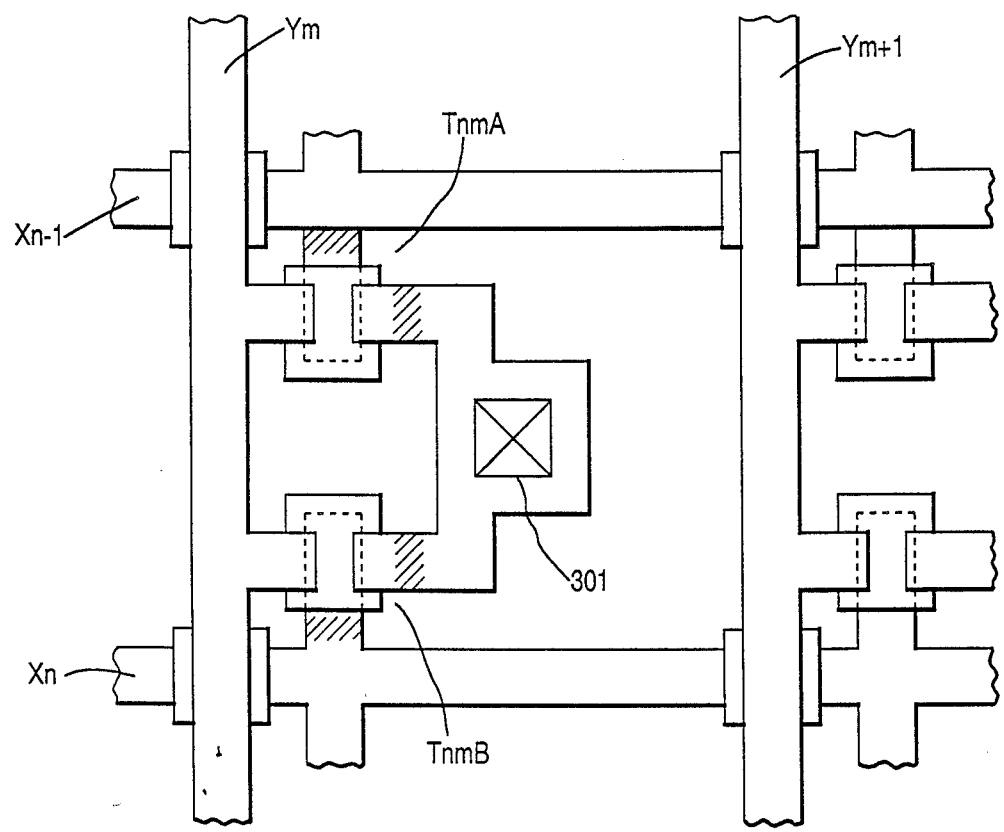
FIG. 8 is a plan view showing the liquid crystal light valve of the invention.
Figure 3:
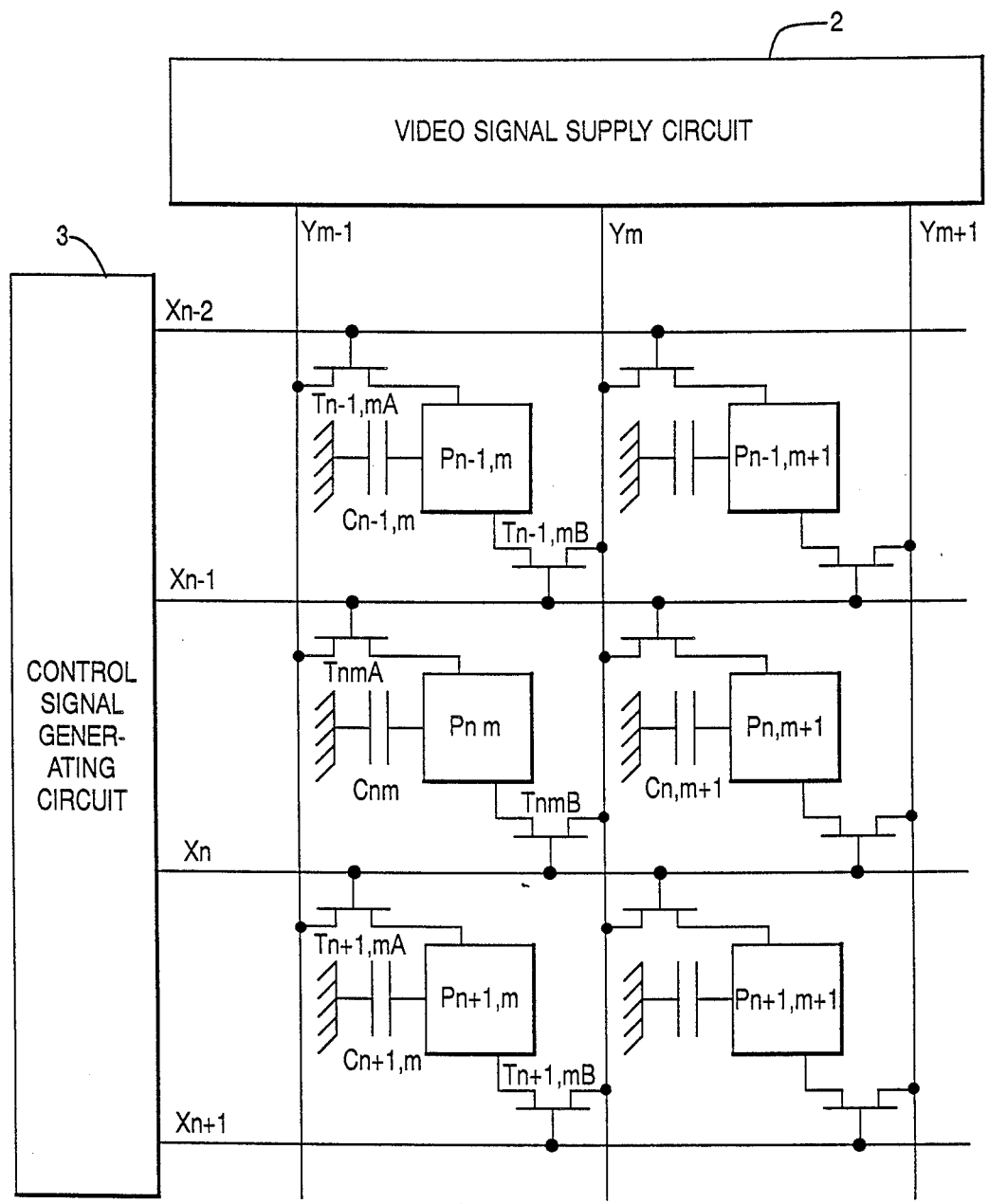
FIG. 3 is a diagram showing an array circuit according to a prior art redundancy arrangement in which two switch elements are provided for each pixel.
Figure 4:
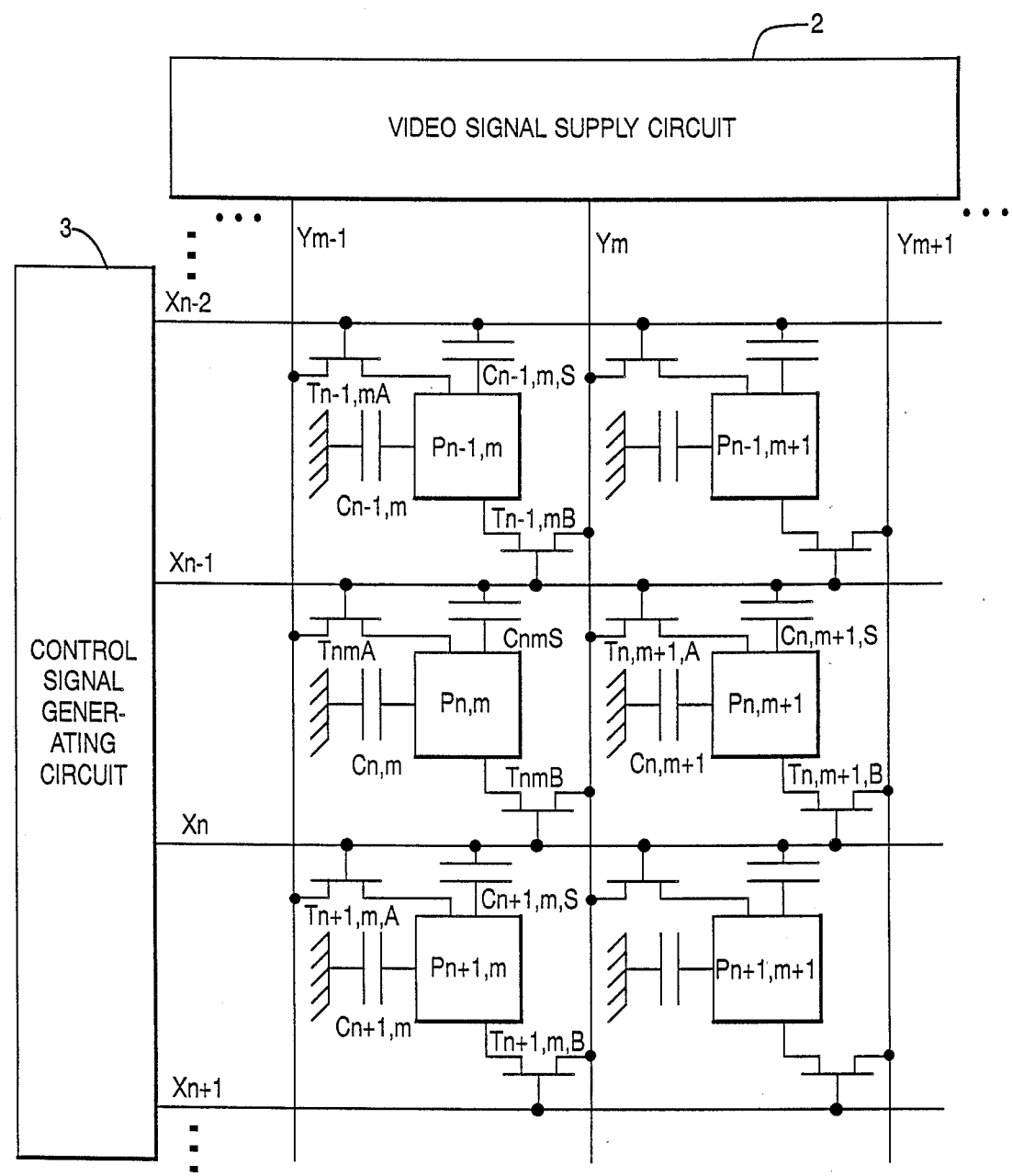
FIG. 4 is a diagram showing an array circuit with a redundancy arrangement in which there are provided two switch elements per pixel, with additional capacitance provided therein.

FIG. 8 is a schematic plan view showing an array circuit formed on the second substrate of the liquid crystal light valve. In the figure, pixel electrodes are not shown. The contact hole 301 is a through-hole which connects the respective drains of TFT Tn,m,A and Tn,m,B with the pixel electrode. The oblique line portions of the gate and drain treminals of each TFT represent positions for application of the earlier explained laser trimming.

Figure 9:
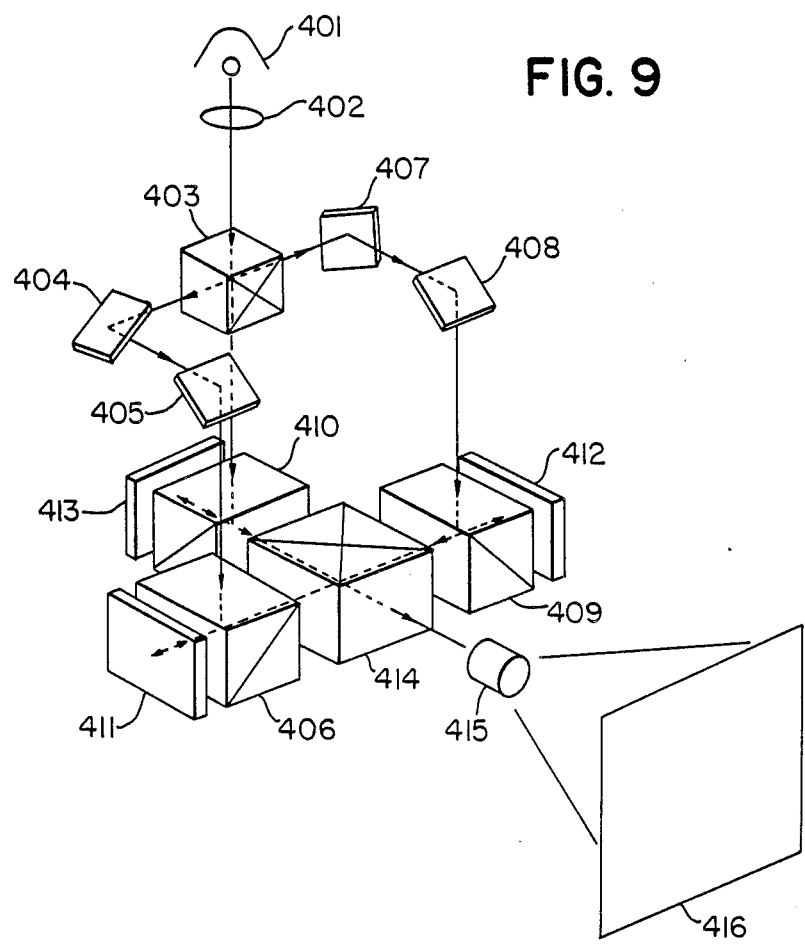
FIG. 9 is a view showing a general arrangement of a second embodiment of the video projector according to the invention.

FIG. 9 shows a second embodiment of the invention. This embodiment represents a video projector intended for obtaining a full color image using three reflective liquid crystal light valves. A light beam from a light source 401 which include a spectrum of three colors, R (red), G (green), and B (blue) is reduced to parallel luminous fluxes by a collimater lens 402, and then splitted into individual color components, R, G, B, by a dichroic prism 403. The R component strikes on a first polarizing splitter 406 through mirrors 404, 405. The B component strikes on a second polarizing splitter 409 through mirrors 407, 408, and the G component strikes directly on a third polarizing splitter 410. Light rays of the individual components incident on the polarizing splitters are modulated by liquid crystal light valves 411, 412, 413, as described with respect to the first embodiment, and then compositely modified by a dichroic mirror 414, so that an image is finally formed by a projection lens 415 on a screen 416. The liquid crystal light valves 411, 412, 413 are each the same as the one described with respect to the first embodiment.

Figure 10:
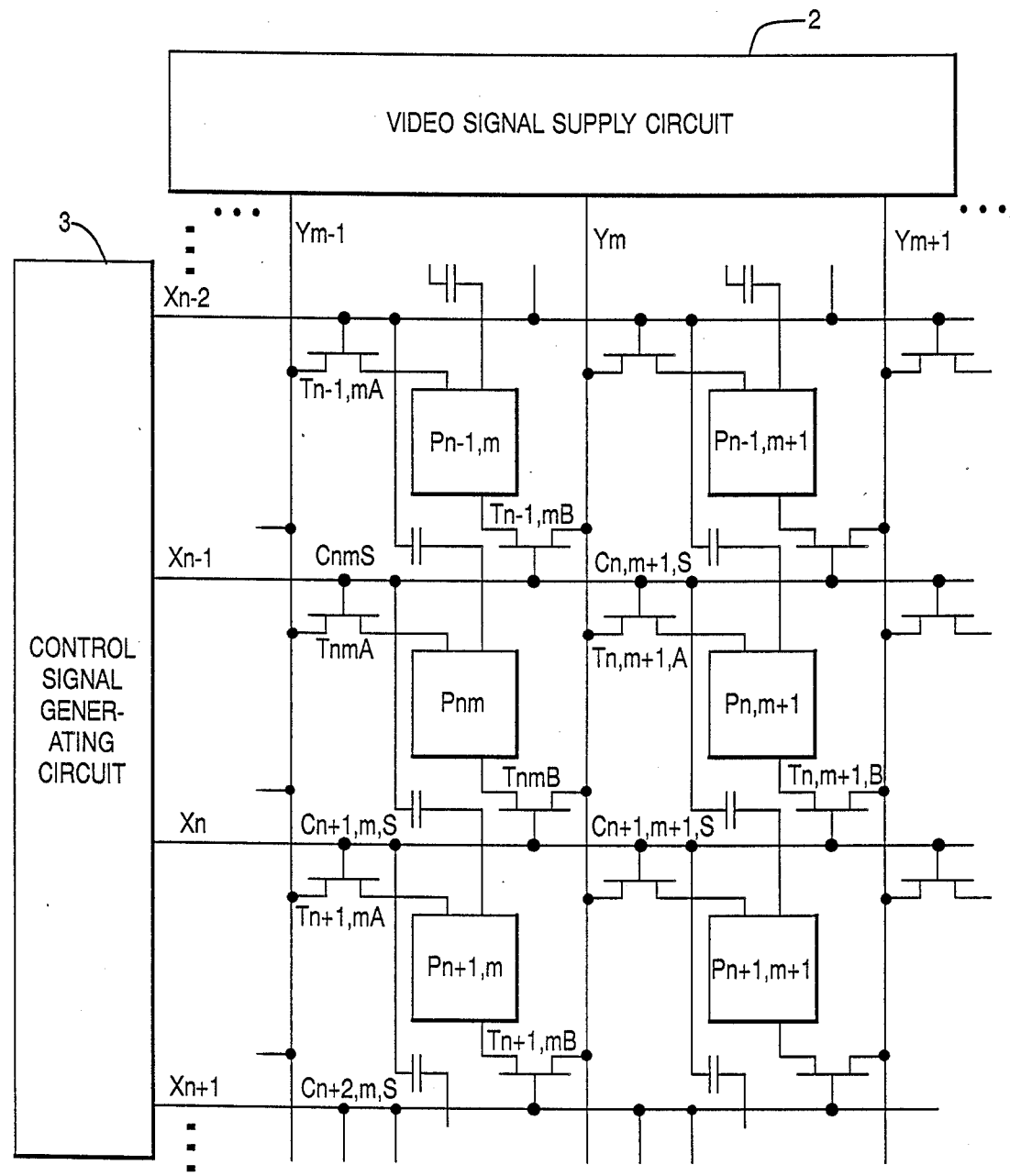
FIG. 10 is a diagram showing an array circuit of another liquid crystal light valve according to the invention.

FIG. 10 shows another embodiment of the liquid crystal light valve of the invention. In this embodiment, a pixel Pn, m is driven by two switch elements Tn,m,A and Tn,m,B which are respectively controlled by adjacent scanning lines Xn−1 and Xn. And additional capacitance Cn,m,S is provided between the pixel electrode and another preceding scanning line Xn−2.

Figure 1:
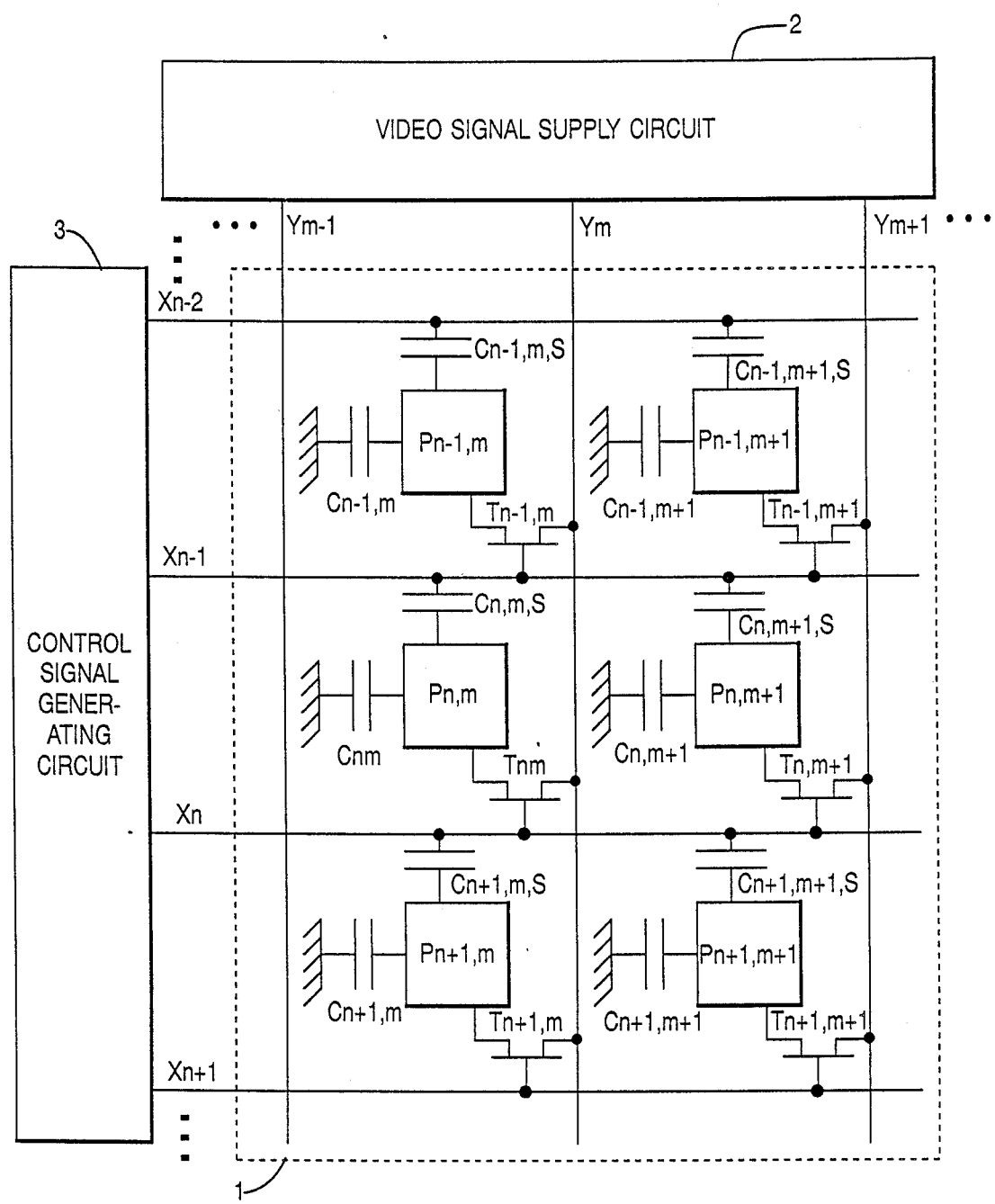
FIG. 1 is an explanatory view of an array circuit in a prior art liquid crystal light valve of the active matrix system.
Figure 2:
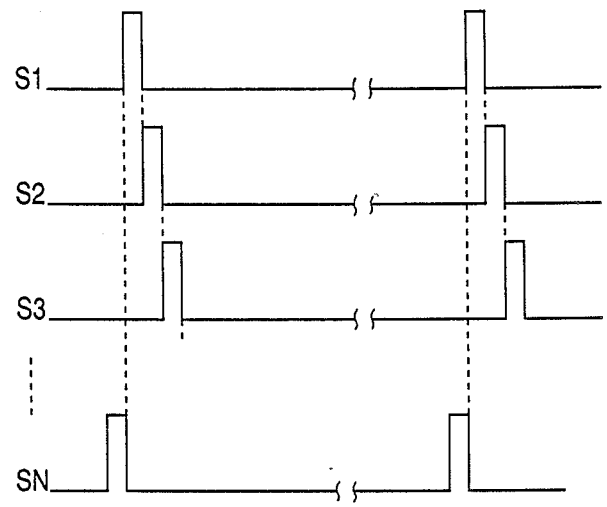
FIG. 2 is a diagram showing wave forms of control signals supplied to scanning lines in the array circuit.

The manner of operation will be explained, first in the case where all the switch elements are in good order. Selection pulses S1, S2, ..., SM as shown in FIG. 2 are sequentially applied to the scanning lines in the order of X1, X2, X3, ..., XN with constant timings. Attention is called to pixel electrode Pn,m. When Xn−2 is selected, the selection pulse is transmitted in part to the pixel electrode through Cn,m,S. This merely causes a fluctuation for only a duration of one selection pulse. At next timing, when scanning line Xn−1 is selected, switch element Tn,m,A becomes conductive and a signal on signal line Ym−1 is supplied to pixel electrode Pn,m. Again, at next timing, when signal line Xn is selected, switch element Tn,m,B becomes conductive, and the voltage of the pixel electrode Pn,m is rewritten by a signal from signal line Ym. Thereafter and until signal line Xn−1 is selected again (in which period one image is rewritten, which period is generally considerably longer than a duration of one selection pulse), the voltage applied previously to the pixel electrode Pn,m is held as it is by a capacitance including the additional capacitance, which votage determines the electro-optical property of the liquid crystal.

Next, such case is considered that the switch element $T_{n,m,B}$, for example, is removed by trimming, due to a short-circuit defect of it. In this case, pixel electrode $P_{n,m}$ is driven by $T_{n,m,A}$ only, and accordingly the signal which should primarily be applied also to pixel electrode $P_{n-1,m-1}$ is applied also to pixel electrode $P_{n,m}$. However, the two pixel electrodes are positioned so close to each other, no particular abnormality can be visually recognized. When the selection pulse on scanning line $X_{n-1}$ for controlling $T_{n,m,A}$ changes from high to low, there is no change in the voltage of the pixel electrode due to capacitive coupling, because no capacitance is present between the scanning line and the pixel electrode. That is, by the provision of the additional capacitance in the manner as above described, any possible adverse effect of capacitive coupling, which has been a serious problem with the prior art arrangements, is completely eliminated.

In FIG. 10, switch element $T_{n,m,A}$ is connected to signal line $Y_{m-1}$, and switch element $T_{n,m,B}$ to signal line $Y_m$, but needless to say, these switch elements may be connected commonly to $Y_{m-1}$ or $Y_m$.

Figure 11:
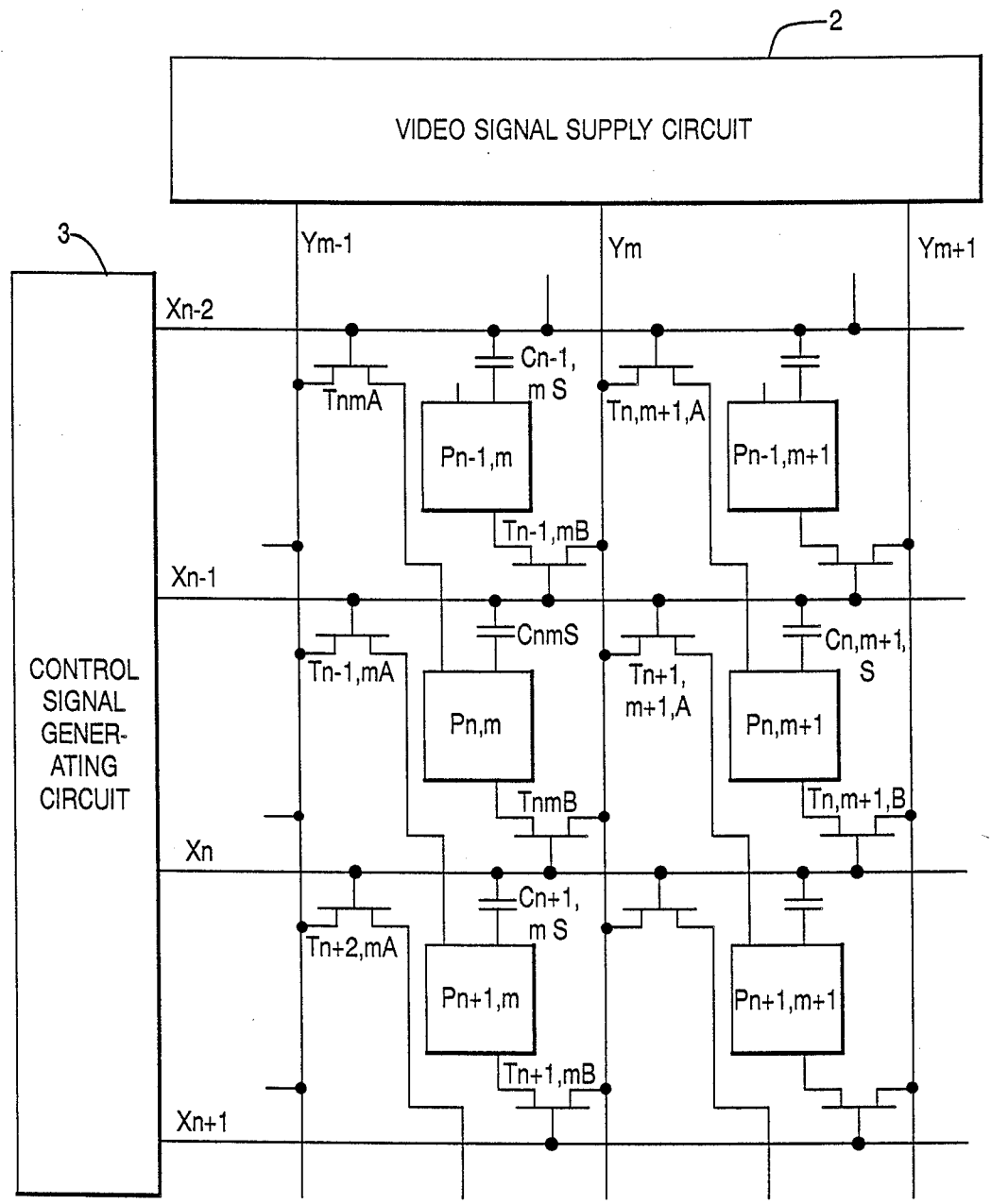
FIG. 11 is a diagram showing an array circuit of still another liquid crystal light valve of the invention.

FIG. 11 shows still another embodiment of the liquid crystal valve of the invention. In this embodiment, two switch elements $T_{n,m,A}$ and $T_{n,m,B}$ for driving pixel electrode $P_{n,m}$ are connected respectively to scanning lines $X_{n-2}$ and $X_n$ for being controlled by them. Further, the additional capacitance $C_{n,m,s}$ is provided between pixel electrode $P_{n,m}$ and scanning line $X_{n-1}$. This arrangement is contrary to the relationship between $T_{n,m,A}$ and $C_{n,m,S}$ in the FIG. 10 embodiment. As is the case with the FIG. 10 embodiment, it is clear that this arrangement is free of any adverse effect of capacitive coupling, even if $T_{n,m,A}$ is removed. The voltage to be applied to the scanning lines and the signal lines is the same as in the earlier described embodiments.

Figure 12:
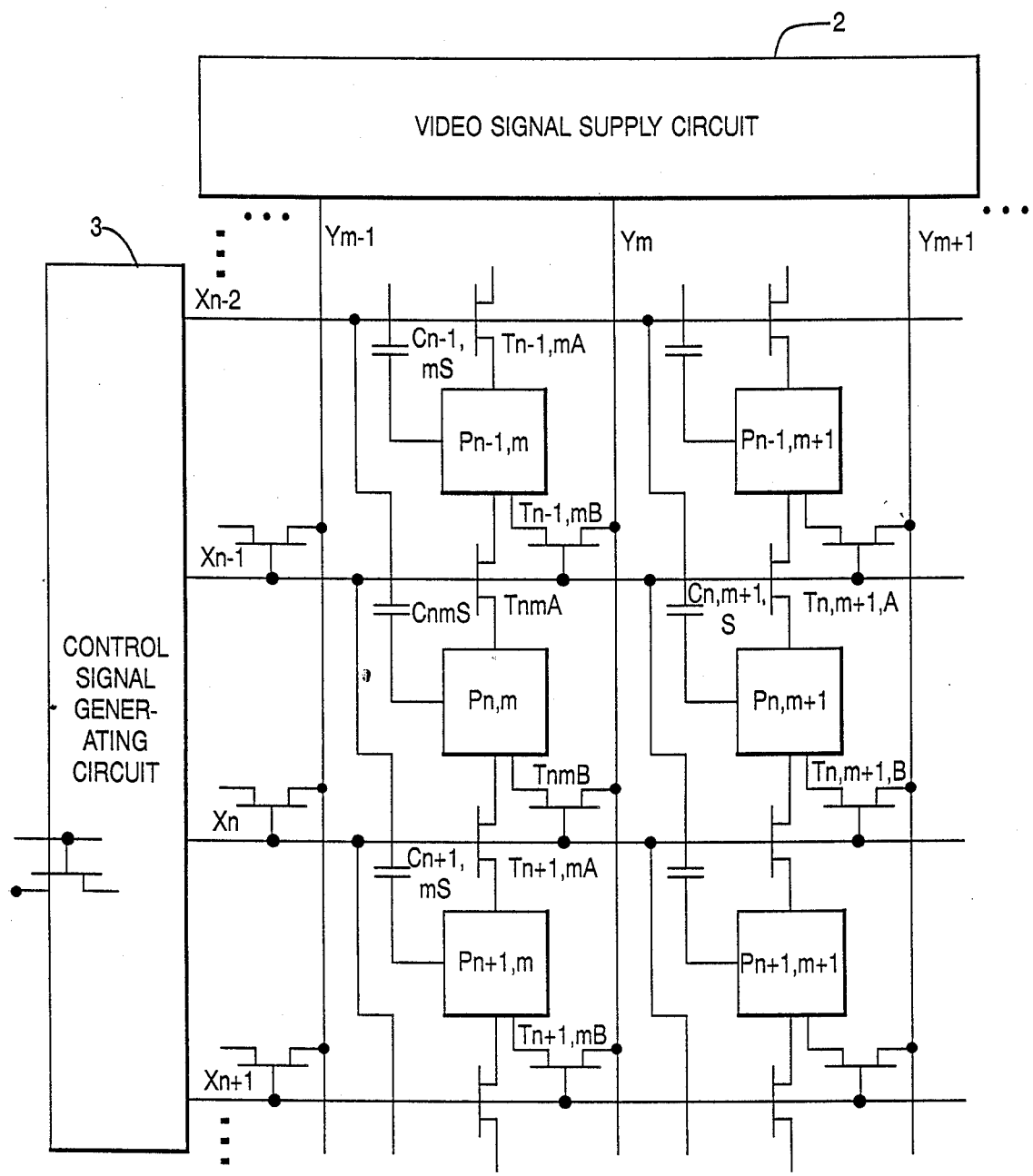
FIG. 12 is a diagram showing an array circuit of yet another liquid crystal valve of the invention.

FIG. 12 shows yet another embodiment in which the present invention is applied to an array of such arrangement as is different from the previously described arrangements. In this embodiment, of the switch elements $T_{n,m,A}$ and $T_{n,m,B}$ corresponding to each pixel electrode $P_{n,m}$, the former switch element connects the pixel electrode $P_{n,m}$ with adjacent pixel element $P_{n-1,m}$, and $T_{n,m,A}$ and $T_{n,m,B}$ are respectively controlled by scanning lines $X_{n-1}$ and $X_n$. Additional capacitance $C_{n,m,S}$ is provided between pixel electrode $P_{n,m}$ and scanning line $X_{n-2}$. The voltage to be applied to scanning and signaling lines is the same as that in the earlier described embodiments.

The manner of operation will be briefly explained. When scanning line $X_{n-1}$ is under selection, switch elements $T_{n,m,A}$ and $T_{n-1,m,B}$ are both conductive, and a signal on signal line $Y_m$ is transmitted to both pixel electrodes $P_{n-1,m}$ and $P_{n,m}$. Next, when scanning line $X_n$ is selected, a signal on signal line $Y_m$ is similarly transmitted to both pixel electrodes $P_{n,m}$ and $P_{n+1,m}$. Therefore, if $T_{n,m,B}$ is defective, both $T_{n,m,B}$ and $T_{n+1,m,A}$ are separated from the array circuit, and pixel electrode $P_{n,m}$ can perform its display function in generally normal way, because it is driven by the same signal as the one given to pixel electrode $P_{n-1,m}$. If $T_{n,m,A}$ is defective, only that switch element is separated. In any case, there is no worry about capacitive coupling due to additional capacitance $C_{n,m,S}$.

What is claimed is:

1. A video projector comprising:
   a reflective type liquid crystal light valve for reflecting a light beam being incident thereon while modulating the polarization of the light beam according to a video signal;
   a light source for generating a light beam; and
   an optical means for linearly polarizing the light beam from the light source, and for leading the linearly polarized light beam to the light valve, and for projecting the modulated light beam reflected from the light valve onto a screen to form a visible image on the screen,
   wherein the light valve comprises:
   a transparent first substrate having on a surface thereof a transparent electrode;
   a second substrate having an active matrix array circuit on a surface thereof opposing the transparent electrode; and a liquid crystal layer interposed between the first and second substrate;
   wherein said active matrix array circuit includes: a plurality of scanning lines for supplying a control signal; a plurality of signal lines arranged to intersect the scanning lines for supplying the video signal; a plurality of pixel electrodes opposing the transparent electrode and being arranged in a matrix to correspond to respective intersecting points of the scanning and signal lines; and a plurality of switching elements for applying the video signal on the signal lines to the pixel electrodes selectively according to the control signal on the scanning lines, the pixel electrodes each having on a surface opposing the transparent electrode a reflective surface for reflecting the light beam being incident thereon from the first substrate side of the light valve and covering the switching elements so that the incident light beam does not reach the switching elements, each of the pixel electrodes being connected to at least two of the switching elements which are respectively controlled by at least two of the scanning lines which are different from each other, and
   wherein a capacitance is formed between each of the pixel electrodes and one of the plurality of scanning lines which is different from the scanning lines for controlling the at least two switching elements connected to the each pixel electrode.

2. A video projector as in claim 1, wherein, if each of the plurality of scanning lines is designate by a sequential number n in a sequential order thereof, then each of the pixel electrodes disposed between an $(n-1)$-th scanning line and an n-th scanning line is connected to two switching elements which are respectively controlled by the $(n-1)$-th scanning line and the n-th scanning line, and the capacitance connected to the each pixel electrode is connected to an $(n-2)$-th scanning line.

3. A video projector as in claim 1, wherein, if each of the plurality of scanning lines is designate by a sequential number n in a sequential order thereof, then each of the pixel electrodes disposed between an $(n-1)$-th scanning line and an n-th scanning line is connected to two switching elements which are respectively controlled by the $(n-2)$-th scanning line and the n-th scanning line, and the capacitance connected to the each pixel electrode is connected to an $(n-1)$-th scanning line.

4. A video projector as in claim 1, wherein each of the at least two switching elements connected to each of the pixel electrodes has on each of its terminal portions an area to be cut off, when defective, by laser trimming so as to be separated from the array circuit.

5. A video projector as in claim 4, wherein the second substrate is transparent at a wave length of a laser beam used for the laser trimming.

6. A video projection comprising:
   a plurality of reflective type liquid crystal light valves each for reflecting a light beam being incident thereon while modulating the polarization of the light beam according to a video signal;
   a light source for generating a light beam; and
   an optical means for splitting the light beam from the light source into a plurality of light beams having different wave lengths from one another, and for linearly polarizing the split light beams, and for leading the linearly polarized light beams respectively to the plurality of light valves, and for projecting the modulated light beams from the light valves onto a screen to form a visible image on the screen;
   wherein each of the light valves comprises:
   a transparent first substrate having on a surface thereof a transparent electrode; a second substrate having an active matrix array circuit on a surface thereof opposing the transparent electrode; and a liquid crystal layer interposed between the first and second substrates,
   wherein said active matrix array circuit includes: a plurality of scanning lines for supplying a control signal; a plurality of signal lines arranged to intersect the scanning lines for supplying the video signal; a plurality of pixel electrodes opposing the transparent electrode and being arranged in a matrix to correspond to respective intersecting points of the scanning and signal lines; and a plurality of switching elements for applying the video signal on the signal lines to the pixel electrodes selectively according to the control signal on the scanning lines, the pixel electrodes each having on a surface opposing the transparent electrode a reflective surface for reflecting the light beam being incident thereon from the first substrate side of the light valve and covering the switching elements so that the incident light beam does not reach the switching elements, each of the pixel electrodes being connected to at least two of the switching elements which are respectively controlled by at least two of the scanning lines which are different from each other, and
   wherein a capacitance is formed between each of the pixel electrodes and one of the plurality of scanning lines which is different from the scanning lines for controlling the at least two switching elements connected to the each pixel electrode.

7. A video projector as in claim 6, wherein, if each of the plurality of scanning lines is designated by a sequential number n in a sequential order thereof, then each of the pixel electrodes disposed between an (n−1)-th scanning line and an n-th scanning line is connected to two switching elements which are respectively controlled by the (n−1)-th scanning line and the n-th scanning line, and the capacitance connected to the each pixel electrode is connected to an (n−2)-th scanning line.

8. A video projector as in claim 6, wherein, if each of the plurality of scanning lines is designated by a sequential number n in a sequential order thereof, then each of the pixel electrodes disposed between an (n−1)-th scanning line and an n-th scanning lines is connected to two switching elements which are respectively controlled by an (n−2)-th scanning line and the n-th scanning line, and the capacitance connected to the each pixel electrode is connected to the (n−1)-th scanning line.

9. A video projection as is claim 6, wherein each of the at least two switching elements connected to each of the pixel electrodes has on each of its terminal portions as area to be cut off, when defective, by laser trimming so as to be separated from the array circuit.

10. A video projector as in claim 9, wherein the second substrate is transparent at a wave length of a laser beam used for the laser trimming.

11. A reflective type liquid crystal light valve for reflecting a light beam being incident thereon while modulating the polarization of the light beam according to a modulation signal, comprising:
    a transparent first substrate having on a surface thereof a transparent electrode;
    a second substrate having an active matrix array circuit on a surface thereof opposing the transparent electrode; and
    a liquid crystal layer interposed between the first and second substrate;
    wherein said active matrix array circuit includes: a plurality of scanning lines for supplying a control signal; a plurality of signal lines arranged to intersect the scanning lines for supplying the modulation signal; a plurality of pixel electrodes opposing the transparent electrode and being arranged in a matrix to correspond to respective intersecting points of the scanning and signal lines; and a plurality of switching elements for applying the modulation signal on the signal lines to the pixel electrodes selectively according to the control signal on the scanning lines, the pixel electrodes each having on a surface opposing the transparent electrode a reflective surface for reflecting the light beam being incident thereon from the first substrate side of the light valve and covering the switching elements so that the incident light beam does not reach the switching elements, each of the pixel electrodes being connected to at least two of the switching elements which are respectively controlled by at least two of the scanning lines which are different from each other, and
    wherein a capacitance is formed between each of the pixel electrodes and one of the plurality of scanning lines which is different from the scanning lines for controlling the at least two switching elements connected to the each pixel electrode.

12. A light valve as in claim 11, wherein, if each of the plurality of scanning lines is designated by a sequential number n in a sequential order thereof, then each of the pixel electrodes disposed between an (n−1)-th scanning line and an n-th scanning line is connected to two switching elements which are respectively controlled by the (n−1)-th scanning line and the n-th scanning line, and the capacitance connected to the each pixel electrode is connected to an (n−1)-th scanning line.

13. A light valve as in claim 11, wherein, if each of the plurality of scanning lines is designated by a sequential number n in a sequential order thereof, then each of the pixel electrodes disposed between an (n−1)-th scanning line and an n-th scanning line is connected to two switching elements which are respectively controlled by an (n−2)-th scanning line and the n-th scanning line, and the capacitance connected to the each pixel electrode is connected to an (n−1)-th scanning line.

14. The light valve as in claim 11, wherein each of the at least two switching elements connected to each of the pixel electrodes has on each of its terminal portions an area to be cut off, when defective, by laser trimming so as to be separated from the array circuit.

15. A light valve as in claim 14, wherein the second substrate is transparent at a wave length at a laser beam use for the laser trimming.

16. A video projection comprising:
a reflective type liquid crystal light valve for reflecting a light beam being incident thereon while modulating the polarization of the light beam according to a video signal;
a light source for generating a light beam; and
an optical means for linearly polarizing the light beam from the light source and for leading the linearly polarized light beam to the light valve, and for projecting the modulated light beam reflected from the light valve onto a screen to form a visible image on the screen,
wherein the light valve comprises:
a transparent first substrate having on a surface thereof a transparent electrode;
a second substrate having an active matrix array circuit on a surface thereof opposing the transparent electrode; and a liquid crystal layer interposed between the first and second substrates;
wherein said active matrix array circuit includes: a plurality of scanning lines for supply a control signal; a plurality of signal lines arranged to intersect the scanning lines for supplying the video signal; a plurality of pixel electrodes opposing the transparent electrode and being arranged in a matrix to correspond to respective intersecting points of the scanning and signal lines; and a plurality of switching elements for applying the video signal on the signal lines to the pixel electrodes selectively according to the control signal on the scanning lines, the pixel electrodes each having on a surface opposing the transparent electrode a reflective surface for reflecting the light beam being incident thereon from the first substrate side of the light valve and covering the switching elements so that the incident light beam does not reach the switching elements, each of the pixel electrodes being connected to at least two of the switching elements which are respectively controlled by at least two of the scanning lines which are different from each other, and
wherein, if each of the plurality of scanning lines is designated by a sequential number n in a sequential order thereof, then each of the pixel electrodes disposed between an (n−1)-th scanning line and an n-th scanning line is connected to the two switching elements which are respectively controlled by the (n−1)-th scanning line and the n-th scanning line, and the capacitance connected to the each pixel electrode is connected to an (n−2)-th scanning line.

17. A video projection comprising:
a plurality of reflective type liquid crystal light valves each for reflecting a light beam being incident thereon while modulating the polarization of the light beam according to a video signal;
a light source for generating a light beam; and
an optical means for splitting the light beam from the light source into a plurality of light beams having different wave lengths form one another, and for linearly polarizing the split light beams, and for leading the linearly polarized light beams respectively to the plurality of light valves, and for projecting the modulated light beams from the light valves onto a screen to form a visible image on the screen;
wherein each of the light valve comprises:
a transparent first substrate having on a surface thereof a transparent electrode; a second substrate having an active matrix array circuit on a surface thereof opposing the transparent electrode; and a liquid crystal layer interposed between the first and second substrates,
wherein said active matrix array circuit includes: a plurality of scanning lines for supply a control signal; a plurality of signal lines arranged to intersect the scanning lines for supplying the video signal; a plurality of pixel electrodes opposing the transparent electrode and being arranged in a matrix to correspond to respective intersecting points of the scanning and signal lines; and a plurality of switching elements for applying the video signal on the signal lines to the pixel electrodes selectively according to the control signal on the scanning lines, the pixel electrodes each having on a surface opposing the transparent electrode a reflective surface for reflecting the light beam being incident thereon from the first substrate side of the light valve and covering the switching elements so that the incident light beam does not reach the switching elements, each of the pixel electrodes being connected to at least two of the switching elements which are respectively controlled by at least two of the scanning lines which are different from each other, and
wherein, if each of the plurality of scanning lines is designated by a sequential number n in a sequential order thereof, then each of the pixel electrodes disposed between an (n−1)-th scanning line and an n-th scanning line is connected to the two switching elements which are respectively controlled by the (n−2)-th scanning line and the n-th scanning line, and the capacitance connected to the each pixel electrode is connected to an (n−1)-th scanning line.

18. A reflective type liquid crystal light valve for reflecting a light beam being incident thereon while modulating the polarization of the light beam according to a modulation signal, comprising:
a transparent first substrate having on a surface thereof a transparent electrode;
a second substrate having an active matrix array circuit on a surface thereof opposing the transparent electrode; and
a liquid crystal layer interposed between the first and second substrate;
wherein said active matrix array circuit includes: a plurality of scanning lines for supplying a control signal; a plurality of signal lines arranged to intersect the scanning lines for supplying the modulation signal; a plurality of pixel electrodes opposing the transparent electrode and being arranged in a matrix to correspond to respective intersecting points of the scanning and signal lines; and a plurality of switching elements for applying the modulation signal on the signal lines to the pixel electrodes selectively according to the control signal on the scanning lines, the pixel electrodes each having on a surface opposing the transparent electrode a reflective surface for reflecting the light beam being incident thereon from the first substrate side of the light valve and covering the switching elements so that the incident light beam does not reach the switching elements, each of the pixel electrodes being connected to at least two of the switching elements which are respectively controlled by at least two of the scanning lines which are different from each other, and wherein, if each of the plurality of scanning lines is designated by a sequential number n in a sequential order thereof, then each of the pixel electrodes disposed between an (n−1)-th scanning line and an n-th scanning line is connected to two switching elements which are respectively controlled by an (n−2)-th scanning line and the n-th scanning line, and the capacitance connected to the each pixel electrode is connected to the (n−1)-th scanning line.

* * * * *